June 25, 1963 H. A. R. WEGENER 3,095,279
APPARATUS FOR PRODUCING PURE SILICON
Filed Aug. 7, 1960
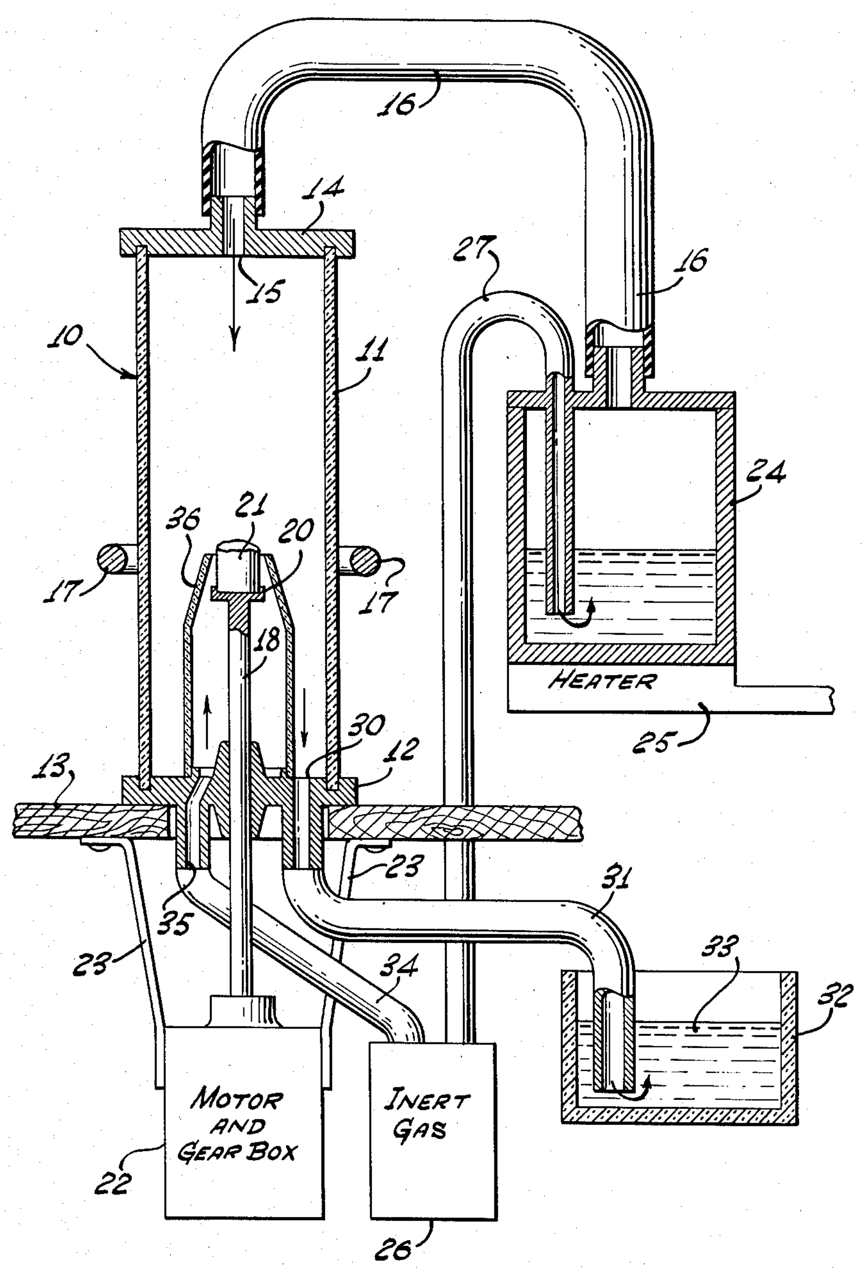
INVENTOR
HORST A. R. WEGENER
BY
Eyre, Mann & Lucas
ATTORNEYS 3,095,279
Patented June 25, 1963

3,095,279

APPARATUS FOR PRODUCING PURE SILICON

Horst A. R. Wegener, Bloomfield, N.J., assignor to Tung-Sol Electric Inc., a corporation of Delaware Filed Apr. 7, 1960, Ser. No. 20,608
4 Claims. (Cl. 23—277)

This invention relates to an apparatus for producing pure silicon and also relates to a method of obtaining the pure metal from a silicon bearing gas.

The production of silicon of high purity in a single crystal growth has long been a major problem in the development of silicon electronic devices such as semi-conductor diodes and transistors. Several techniques have been used to produce pure silicon. One of these is the zinc reduction of silicon tetrachloride. Other methods include the reduction of certain silicon salts in the presence of hydrogen and the cracking of silicon hydride. After pure silicon has been obtained, it is further purified and formed into a single crystal by the floating zone method of purification. All electrically active impurities, with the exception of boron, can be removed from a single crystal silicon rod and segregated at one end by this floating zone process. In all prior methods of purifying silicon at least two or three separate processes were used. This necessitated handling the material several times and sometimes storing it for a considerable time interval and always resulted in the increase of impurities and a change of the electrical properties of the silicon. In many cases there is enough foreign material in the air to affect the purity of the silicon. The prime advantage of the method to be described resides in the fact that pure silicon single crystals are obtained from any one of a number of silicon bearing compounds by a single process in which the silicon is not brought in contact with the atmosphere nor with any other material which might change its chemical composition or inject impurities into the crystal structure.

One of the objects of this invention is to provide an improved apparatus and method of producing pure silicon which avoids one or more of the disadvantages and limitations of prior art arrangements and methods.

Another object of the invention is to simplify the production of pure silicon by employing a single piece of equipment for the entire operation.

Another object of the invention is to decrease the cost of obtaining pure silicon by using an apparatus which heats the silicon crystal only once.

Another object of the invention is to reduce the time taken to change a silicon bearing compound into the pure metal.

The invention includes an enclosed cracking chamber for reducing the silicon bearing gas to metallic silicon. The silicon gas is forced through an entrance conduit at one end of the chamber and is applied to a globule of molten silicon secured at the center of the chamber, the chamber being provided with means for lowering the crystal mount as the silicon is deposited. The molten silicon is heated by an induction coil provided with high frequency electrical current. The cracked gas is conveyed through an exit conduit and is generally absorbed in a liquid bath.

One feature of the invention includes a ceramic shield surrounding the silicon crystal. An inert gas is forced through the space within the shield to cool the solid portion of the crystal. Another feature of the invention is the application of an inert carrier gas to the stream of silicon bearing vapor which enters the cracking chamber. This carrier gas provides a more uniform flow of the silicon bearing vapor and may act as a reagent in the cracking process.

For a better understanding of the present invention, together with other and further objects thereof, reference is made to the following description taken in connection with the accompanying drawing.

The FIGURE is a schematic diagram showing the apparatus with parts in cross section.

The apparatus includes a cracking chamber 10 where the silicon bearing vapor is converted into pure silicon. The cracking chamber includes a cylinder 11 which may be made of quartz and is supported by a metal base 12 which is secured to a base plate 13. The upper end of the cylinder 11 is closed by a top portion 14 having an entrance conduit 15 which is joined to a pipe or flexible tube 16 for the application of silicon bearing vapor. The cylinder 11 is surrounded by an induction heating coil 17 which is connected to a source of high frequency electrical power. This coil is used for maintaining a portion of the silicon within the chamber in a molten state.

Within the cylinder 11 and journaled in base 12 is a mounting rod 18 whose top end 20 contains a chuck for holding the silicon crystal seed 21. The lower end of rod 18 is coupled to a gear box and motor 22 which turns the rod 18 and slowly lowers the rod as the silicon is deposited. The motor and gear box can be secured to the base 13 by mounting straps 23.

Silicon bearing vapor for application to the cracking chamber by means of conduit 16 may be obtained in a number of ways and a large number of silicon compounds may be employed in this process. One of the most convenient silicon compounds is silicon chloroform ($SiHCl_3$) which may be placed in a closure 24 and heat applied to the material through a base heater means 25. By heating this compound, the material is vaporized and gaseous silicon tetrachloride is driven through conduit 16 into the cracking chamber 10. In order to control the concentration of the silicon bearing vapor and help maintain the material in a gaseous state, a source of inert gas 26 is provided and a connection is made by means of a pipe 27 into the closed vessel 24 at a point below the level of the heated compound. The inert gas may be hydrogen, argon, helium, or any other inert gas that will not contaminate the single silicon crystal.

An exit conduit 30 is provided at the bottom of the cracking chamber 10 for the flow of the cracked gas to the outside atmosphere. In the case of silicon chloroform, chlorine gas and hydrogen chloride are the end products and since these are very corrosive, they are conveyed through a conduit 31 and discharged into an absorber tank 32 which may be filled in this case with water 33. The chlorine will be mixed with quantities of silicon tetrachloride since not all of the gas will be cracked. Most of these gases will be absorbed by the water 33 or by other absorbing chemicals placed in tank 32 in addition to the water. They may later be recovered and recirculated.

In order to prevent deposition of silicon on the solid portion of the rod 18, a shield 36, made of insulating material such as quartz or ceramic, is mounted in axial alignment with the mounting rod and the crystal 21 and inert gas is delivered through a conduit 34 to the space within the shield. Thus a steady stream of gas flows past the sides of the crystal and maintains this space at a pressure higher than that of the silicon-bearing vapor entering from conduit 15.

The operation of this device is obvious from the foregoing description. To start with, a seed of crystal silicon is placed on the chuck surface 20 of mounting rod 18. Then the inert gas is made to flow through conduit 34. The heating current is turned on and, as soon as the top of the seed crystal is melted, the gas from chamber 24 is started and flows through the cracking chamber. Because of the elevated temperature of the molten silicon, the silicon gas is cracked and pure silicon is incorporated in the pool of molten silicon on the seed. The process is continued and, as the volume of the molten silicon metal builds up, the rod 18 is lowered to solidify the lower portion of the silicon rod. When rod 18 has been lowered to its full extent, the crystal may be removed and cut up in the usual manner but if it is desired to still further purify the crystal, the floating zone chamber purification method may be employed without removing the crystal from the cracking chamber. The same mounting rod and the same heating coil may be used for floating zone purification. A simple clamp is installed which holds the top of the crystal. Then the motor 22 is started so that the crystal moves up through the plane of coil 17 in accordance with the well-known purifying method.

It should be understood that the method and apparatus herein described can be used with other metals and other gases and the method is not limited to the particular materials disclosed. The invention should be limited only by the limitations of the appended claims.

What is claimed is:

1. Apparatus for producing a silicon crystal from a gas containing silicon comprising, an enclosed cracking member including an entrance conduit at one end and an exit conduit at the other end, means for producing a steady flow of silicon bearing gas through the entrance conduit into the cracking chamber, a mounting for a rod of metallic silicon disposed near the central portion of the cracking chamber with motor means for turning the mount and lowering it as the silicon is deposited, induction heating means connected to a source of high frequency power for maintaining the top portion of the silicon in a molten state, means for expelling the cracked gas through said exit conduit and means for delivering a stream of cooling gas to said mounting to prevent the deposition of silicon from the silicon bearing gas onto the solid portion of the single silicon crystal.

2. Apparatus for producing a silicon crystal from a gas containing silicon atoms comprising, an enclosed cracking chamber including an entrance conduit at one end and an exit conduit at the other end, means for producing a steady flow of silicon bearing gas through the entrance conduit into the cracking chamber, a base mounting for a rod of solid metallic silicon disposed near the central portion of the cracking chamber with motor means for turning the mount and lowering it as the silicon is deposited, induction heating means connected to a source of high frequency power for maintaining the top portion of the silicon rod in a molten state, means for expelling the cracked gas through said exit conduit, and a shield disposed in said cracking chamber adjacent to the silicon rod to prevent deposition of silicon from the vapor onto the solid portion of the silicon crystal and for maintaining the inert gas pressure adjacent to the solid portion of the rod at a pressure higher than the pressure due to the silicon bearing gas.

3. Apparatus for producing a silicon crystal as set forth in claim 2 wherein said shield is frusto-conical and its end of larger diameter is supported on the lower end of the cracking chamber with its upper end of smaller diameter immediately adjacent the solid portion of the silicon crystal but separate therefrom and an additional entrance conduit is formed in the lower end of the cracking chamber within the confines of the shield for connection to a storage tank containing an inert cooling gas.

4. Apparatus for producing a silicon crystal as set forth in claim 3 wherein hydrogen is one of said inert gases used as carrier and coolant.

References Cited in the file of this patent

UNITED STATES PATENTS

| | | |
|---|---|---|
| 1,892,862 | Wilcox | Jan. 3, 1933 |
| 2,851,342 | Bradshaw et al. | Sept. 9, 1958 |
| 2,883,269 | Krchma | Apr. 21, 1959 |
| 2,912,311 | Mason et al. | Nov. 10, 1959 |

FOREIGN PATENTS

| | | |
|---|---|---|
| 745,698 | Great Britain | Feb. 29, 1956 |